Dec. 13, 1927.

G. M. McGINLEY

FASTENER

Filed Jan. 11, 1926

1,652,575

Inventor:
George M. McGinley
by Emery, Booth, Janney & Varney
Attys.

Patented Dec. 13, 1927.

1,652,575

UNITED STATES PATENT OFFICE.

GEORGE M. McGINLEY, OF AMESBURY, MASSACHUSETTS, ASSIGNOR TO G. W. J. MURPHY COMPANY, OF AMESBURY, MASSACHUSETTS, A CORPORATION OF MASSACHUSETTS.

FASTENER.

Application filed January 11, 1926. Serial No. 80,393.

This invention relates to fasteners such as are used for securing the curtains of automobiles and for other similar uses and the object is to provide an efficient and durable fastener for such applications.

My invention will be well understood by reference to the following description of the illustrative embodiment thereof shown by way of example in the accompanying drawings, wherein.

The fastener which I am about to describe as an example of the invention is of that type having a cross-bar or head exposed at one side of the curtain or other supporting member, which cross-bar may be manipulated from the opposite side of the curtain and may be made to enter a suitable opening and thereafter may be turned to engage the margin of this opening to be retained therein.

Figure 2:
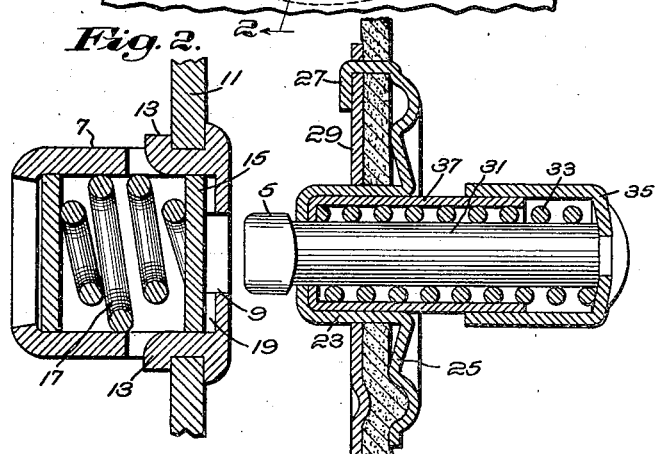
Fig. 2 is a central vertical section through the fastener and a suitable cooperating socket which may be used therewith, the said parts being shown separated.
Figure 3:
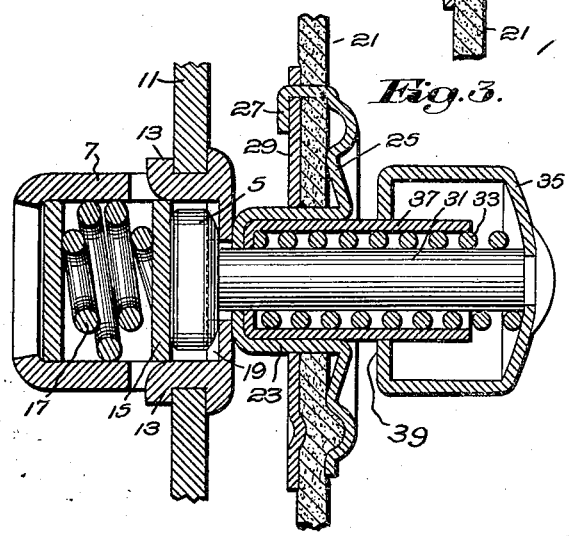
Fig. 3 is a similar view showing the fastener engaged with the socket.
Figure 4:
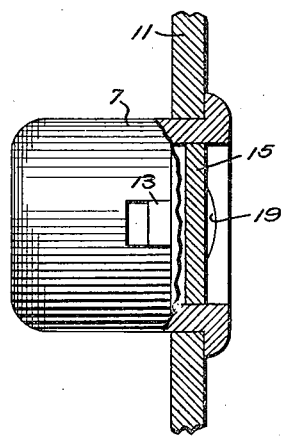
Fig. 4 is a plan of the socket partly broken away as seen from above in Figs. 2 and 3.

I have herein shown a fastener having a cross-head 5 adapted to be secured in a suitable socket member 7 having a cylindrical body, the front wall of which is provided with an oblong opening 9, the shorter dimension of this opening appearing in Figs. 2 and 3 and the longer dimension in Fig. 4. The cylindrical member 7 is adapted to be mounted in the metal wall 11 of an automobile body with such front wall substantially flush therewith and to that end may be engaged with said body by means of lugs 13 struck up from the cylindrical wall thereof, conveniently by means of a tool inserted through the opening 9, and clinched on the rear side of the wall 11. The opening 9 may normally be closed when the fastener is not engaged with the socket by means of a depressible closure or follower plate 15 sliding within the cylindrical socket 7 and normally pressed against the rear of the front wall by the spring 17. When the fastener is engaged with the socket the follower 15 is pressed rearwardly by the head 5 as shown in Fig. 3. The spring 17 may also serve to aid in retaining the cross-head in engagement beneath the margins of the opening 9, for instance, in the recesses 19 (see Fig. 4) provided at the extremities of the minor axis of the opening. While I prefer to use such a socket as described, it is by no means necessary and the cross-bar or head 5 might, for instance, be engaged with a simple oblate hole cut in the wall 11 of the automobile body or with an eyelet in a flexible member or with any other suitable opening.

Referring now to the construction of that part of the fastener which in the example illustrated is engaged with the curtain 21 which is to be attached to the body 11, this may include a suitable base embodying a cup-like body portion 23 of a diameter at least equal to the longer dimension of the head 5 (see Fig. 3), from the open side of which cup extends an annular flange 25 adapted to overlie the outer face of the curtain 21 and providing convenient means for securing the fastener as a whole to the curtain. Herein the flange 25 is provided with prongs 27 which pass through the curtain and are clinched over a suitable washer 29 on the rear thereof which may, if desired, as herein shown, closely embrace the cup-like body 23 which extends rearwardly through the curtain 21.

Figure 1:
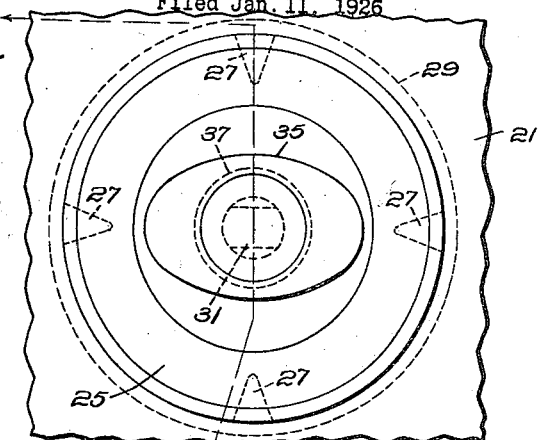
Fig. 1 is a front elevation of the fastener.

The cross-head 5 at the rear of the fastener is mounted on a shank 31 extending through the bottom of the cup 23 and having a rotating and sliding bearing therein, which shank 31 is normally thrust toward the right in Figs. 1 and 2, that is, toward the outside of the curtain, by means of a suitable spring which may be housed, at least in part, in the cup 23 and I have herein shown a helical spring 33 seated in the cup and encircling the shank 31 and bearing against a suitable manipulating head 35 secured to the right hand end of the shank.

In the embodiment of the invention shown I provide a tube 37 seated in the cup 23 and extending outwardly beyond the front face 25 of the fastener, which tube surrounds and receives the spring 33.

To insure proper alingnment of the shank 31 substantially perpendicular to the curtain 21 in order that the installation of the fasteners may be seemly in appearance and to prevent binding of the parts and facilitate their operation, a second bearing additional to that provided in the bottom of the cup 23 and relatively remote therefrom is preferably provided for the shank 31. In the illustrated form of the invention the head 35 carried on the shank 31 is adapted to telescope with a portion of the base of the fastener, herein the tube 37. The head 35 is preferably formed as a hollow stamping of oblate or elliptical section, as indicated in Fig. 1, and having a rear wall 39 (see Fig. 3) provided with a circular opening fitting closely around the tube 37 and thus providing a sliding and rotating bearing. The spring 31 may bear on the inner side of the front wall of the head 35. The depth of the head 35, which must in any instance be sufficient to permit proper grasping thereof by the fingers to permit rotating of the shank 31 and with it the cross-head 5, is thus utilized as a housing for a part of the spring 33.

The operation of the fastener may be readily understood from Figs. 2 and 3. Referring to Fig. 2, the fingers grasp the head 35 and push the whole fastener with the curtain attached toward its cooperating socket with the longer dimension of the cross-bar 5 aligned with the longer dimension of the opening 9 so that it passes therethrough. When the rear of the cup 23 seats against the margin of the opening, the shank with its attached heads is pushed bodily toward the left relatively to the base of the fastener compressing the spring 33 and displacing the follower 15 until the head 5 is carried rearwardly of the margin of the opening 9 when the shank may be rotated so that the longer dimension of the head 5 is transverse to the longer dimension of the opening 9 and the head is locked behind the margin of the opening. As it reaches this position it may seat in the recesses 19 when such recesses are provided and is retained therein, when the head 35 is released, by the expansion of spring 33 and also, in the example shown, by the pressure on the cross-head 5 of the spring-pressed follower or closure 15.

It will be noted that the parts of the fastener may be very readily constructed and they may be very simply assembled in the following manner. The shank 31 with the cross-head 5 being provided, the right hand end of the shank being as yet not headed over, the various parts may be simply dropped thereover by a movement corresponding to a movement from the right in Fig. 2. Thus successively the cup-shaped body 23 with its attached flange 35, the tube 37, the spring 33 and the head 35 may be supplied and all the parts may then be secured together by heading over the end of the shank on the outside of the manipulating head 35. While the parts of the fastener are inseparably connected in the manner just described, its installation on the curtain is readily effected by means of the prongs 27.

Among the advantages of the construction shown the following may be mentioned without thereby attempting to be exhaustive. The fastener is neat in appearance, particularly as seen from the outside of the curtain. Its depth or dimension transversely of the curtain is relatively small so that there is not objectionable projection although ample range of movement of the parts is provided for. The shank 31 is firmly held by relatively widely spaced bearings. The provision of a cup-like body 23 extending rearwardly permits utilizing the thickness of the curtain or other supporting member for useful purposes in the internal construction of the fastener and it may provide the bottom of such cup extending as shown rearwardly of the rear wall of the curtain to provide a firm bearing for the head in the retracted position of Fig. 2 and also to serve as an abutment for the front margin of the opening 9 so that when the parts are engaged, as shown in Fig. 3, there is a firm interlocking action of relatively rigid parts seating one against the other under the action of the retaining spring 33. The head 5 is supported in position at the rear of the curtain so that its engagement with the socket is facilitated.

I have described in detail the particular embodiment of my invention shown by way of example in the accompanying drawings. Obviously the construction may be widely varied from that shown without departing from the spirit of the invention and therefore the detailed character of the description is not to be taken as limiting or defining the scope of the invention.

What I claim as new and desire to secure by Letters Patent I shall express in the following claims.

1. A fastener for curtains or the like comprising a cup-like base having an annular flange, means to secure the flange to a face of a supporting member with said cup-like part extending rearwardly toward the opposite face, a shank passing through the bottom of the cup having heads at opposite ends thereof and a spring received in the cup and tending to move said shank in one direction.

2. A fastener for curtains or the like comprising a cup-shaped base having means whereby it may be secured to a face of the curtain with the side wall of the cup extending rearwardly therethrough, a shank extending through the bottom of the cup, a head at the front end of the shank for manipulating the same to engage the rear end with a cooperating fastener element, a spring received in the cup and acting on the shank, a tubular member having a bearing on the wall of the cup and the forward head and slidable relatively to one of them.

3. A fastener for curtains or the like comprising a cup-shaped base having means whereby it may be secured to a face of the curtain with the side wall of the cup extending rearwardly therethrough, a tube inset in the cup, a shank extending through the bottom of the cup, a head on the front end of the shank for manipulating the same to engage the rear end with a cooperating fastening element, said head partly embracing said tube and telescoping therewith and a spring received in the tube and acting on said head.

4. A fastener for curtains or the like comprising a cup-shaped base having means whereby it may be secured to a face of the curtain with the side wall of the cup extending rearwardly therethrough, a tube inset in the cup, a shank extending through the bottom of the cup, an oblate head on the front end of the shank for manipulating the same to engage the rear end with a cooperating fastening element, which head has a bearing on and is guided by said tube, and a spring received in the tube and acting on said shank.

5. In a fastener for curtains or the like a base comprising a cup having means at the open side thereof for securing it to a face of a supporting member with the cup extending therethrough rearwardly toward the back, a shank passing through the bottom of the cup and having a bearing therein, means on the rear end of the shank for engaging a cooperating fastening member, a spring received in the cup and acting on said shank and means cooperating with the base at the forward face of the supporting member to support the forward portion of the shank and provide a second bearing therefor to preserve the alignment thereof.

6. A fastener for curtains or the like comprising a cup-shaped base secured to the curtain with the side wall of the cup extending therethrough, a shank passing through the bottom of the cup having heads at opposite ends thereof and a spring received in the cup and tending to move said shank in one direction.

7. A fastener for curtains or the like comprising a cup-shaped body adapted to be mounted in a curtain with the bottom of the cup extending past the rear thereof and having means at its open side to overlie the front face of the curtain for securing it thereto, a head bearing on the bottom of the cup, a pivot for the head extending through said bottom and means received in the cup cooperating with the pivot to assist in positioning said head.

8. A fastener for curtains or the like comprising a cup-shaped body adapted to be mounted on a curtain with the bottom of the cup extending past a face thereof and having a flange at its open side to overlie the other face of the curtain, a washer encircling the cup at the first face and secured to said flange to clamp the curtain, a head bearing on the bottom of the cup, a pivot for the head extending through said bottom and means received in the cup cooperating with the pivot to assist in positioning said head.

9. A fastener for curtains comprising a body to extend through the curtain having a flange to overlie and be secured to a face thereof, a shank passing through and rotatable in said body and heads permanently secured to the ends of said shank.

10. A fastener for curtains comprisng a body to extend through the curtain having a flange to overlie a face thereof, a washer encircling said body to overlie the opposite face of the curtain and means to connect said washer and flange whereby to clamp the curtain between them, a shank passing through and rotatable in said body and heads permanently secured to the ends of said shank.

In testimony whereof, I have signed my name to this specification.

GEORGE M. McGINLEY.